United States Patent [19]
Moyer

[11] 3,955,678
[45] May 11, 1976

[54] SORTING SYSTEM
[75] Inventor: Ernest P. Moyer, Frederick, Md.
[73] Assignee: American Chain & Cable Company, Inc., Bridgeport, Conn.
[22] Filed: Aug. 9, 1974
[21] Appl. No.: 496,316

[52] U.S. Cl. .............................. 209/74 M; 198/34; 250/223 R
[51] Int. Cl.² ......................................... B65G 47/30
[58] Field of Search ............... 209/73, 74 R, 74 M, 209/111.7; 198/38, 34; 214/11 R, 11 A, 11 C; 250/223 R

[56] References Cited
UNITED STATES PATENTS

| | | | |
|---|---|---|---|
| 2,825,476 | 3/1958 | Muller | 214/11 A |
| 3,096,871 | 7/1963 | Anderson | 250/223 R |
| 3,242,342 | 3/1966 | Gabar | 209/111.7 |
| 3,485,339 | 12/1969 | Miller et al. | 250/223 R |

OTHER PUBLICATIONS
RCA Technical Notes, TN No. 802, Nov. 15, 1968.

Primary Examiner—Robert B. Reeves
Assistant Examiner—Joseph J. Rolla
Attorney, Agent, or Firm—Barnes, Kisselle, Raisch & Choate

[57] ABSTRACT

In accordance with the invention, a control system is provided for maximizing flow rate and sorting rate by minimizing the spacing between articles of varying length. The system measures the length of the articles and controls their movement into the sortation system so as to minimize spacing between the articles. The system permits maximizing the rate of sortation while taking into account conveyor speed, length of time for diverting to zones, length of the articles and spacing between them. In addition, the system is arranged to prevent false signals due to tags and the like.

8 Claims, 5 Drawing Figures

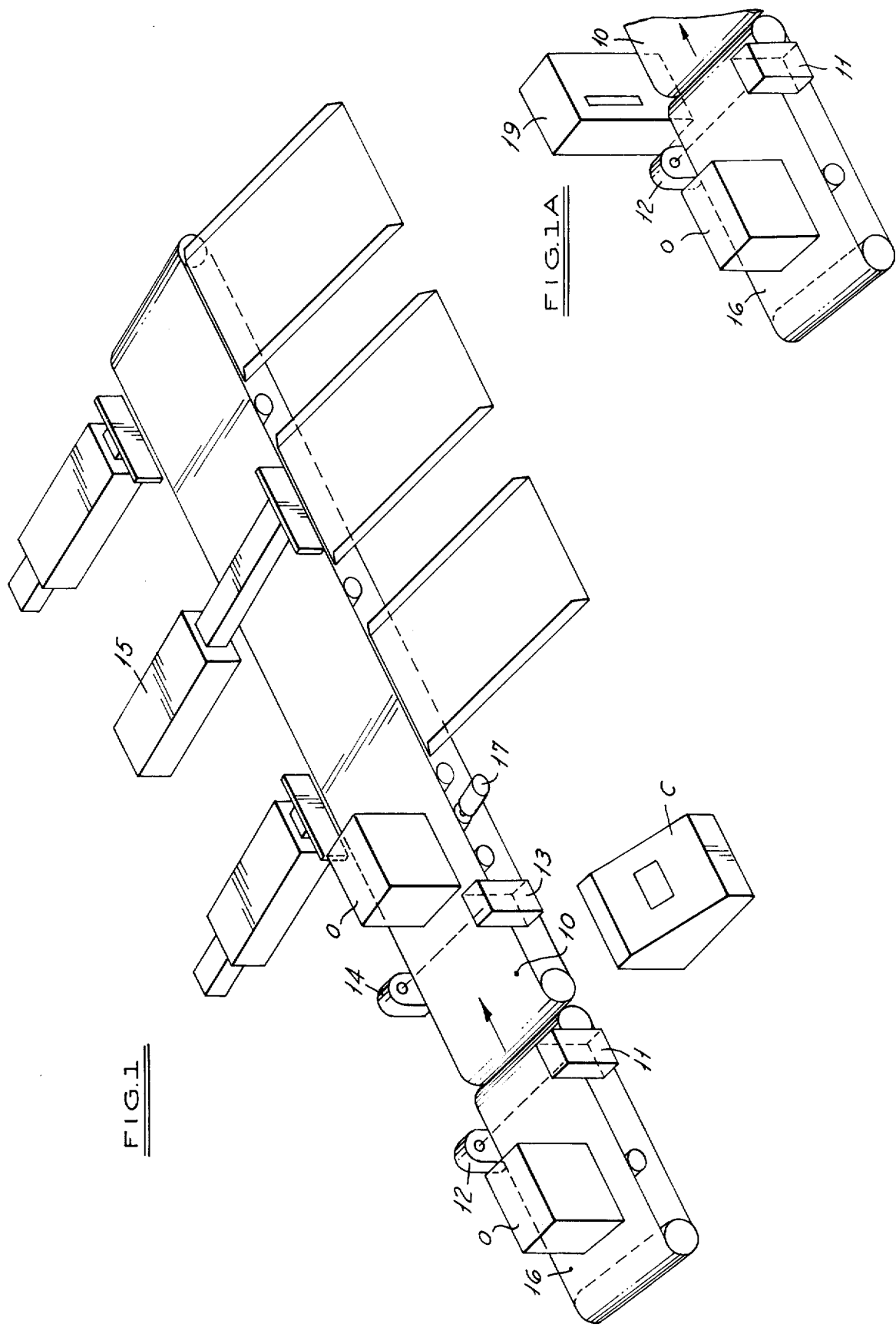

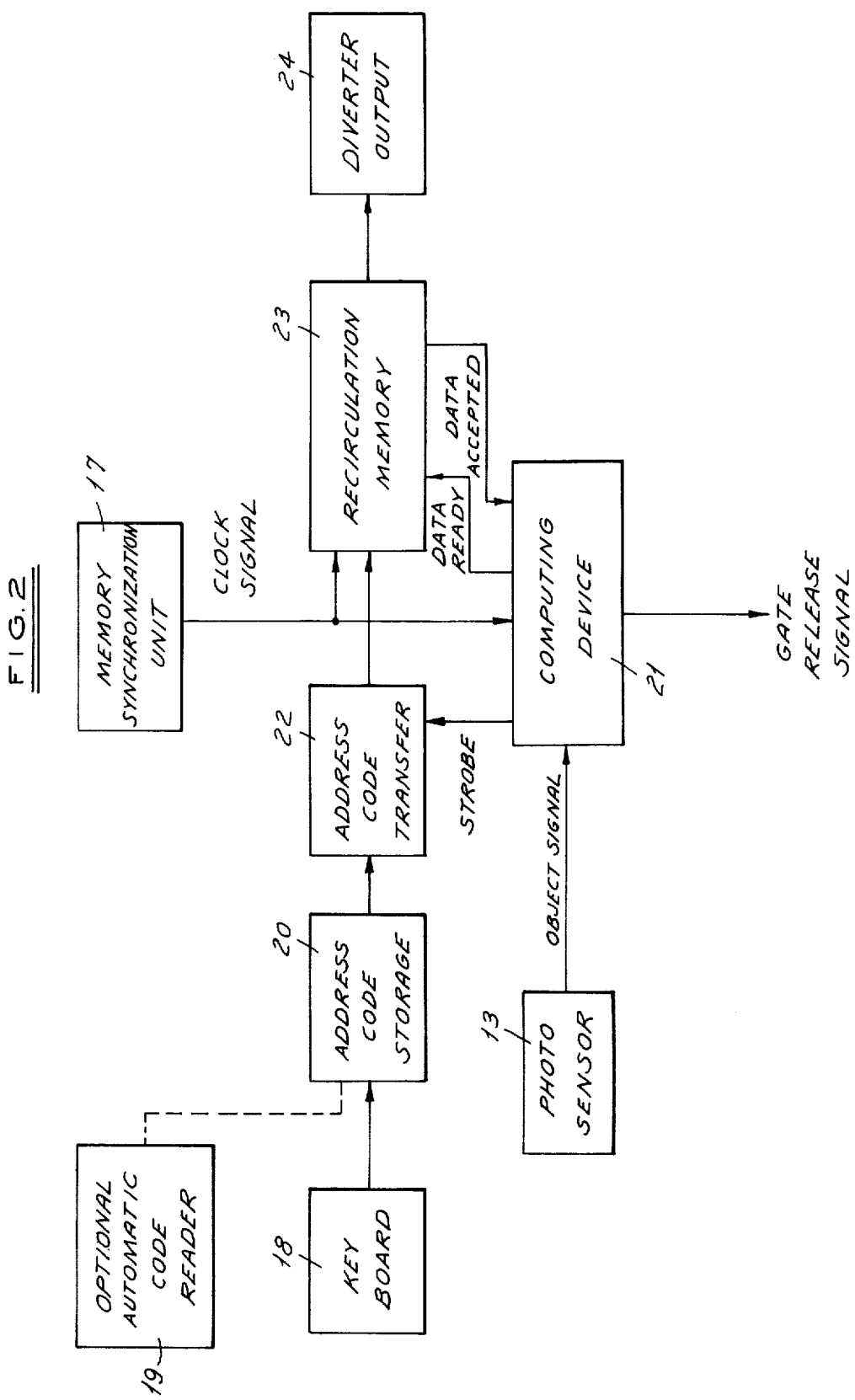

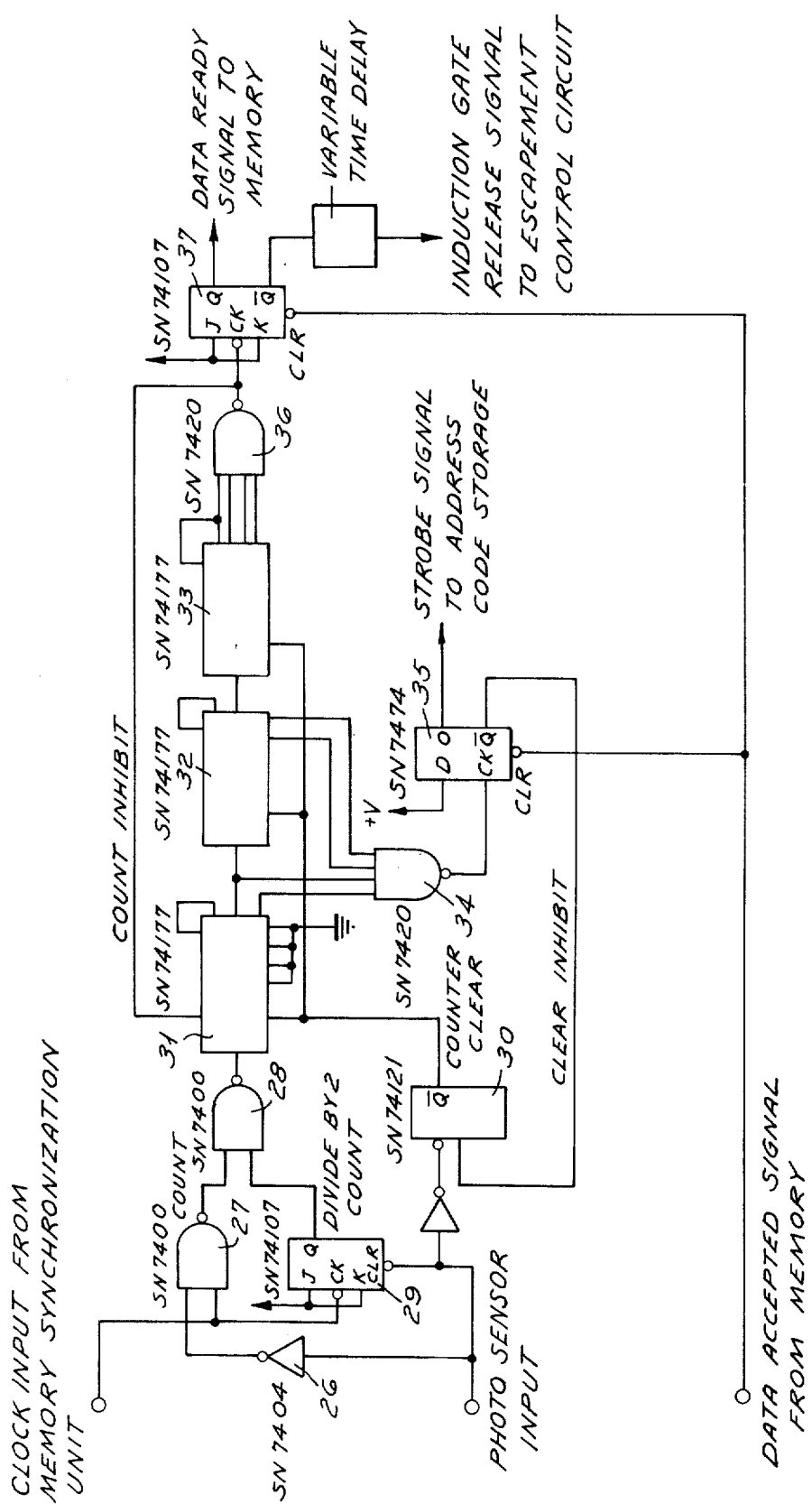

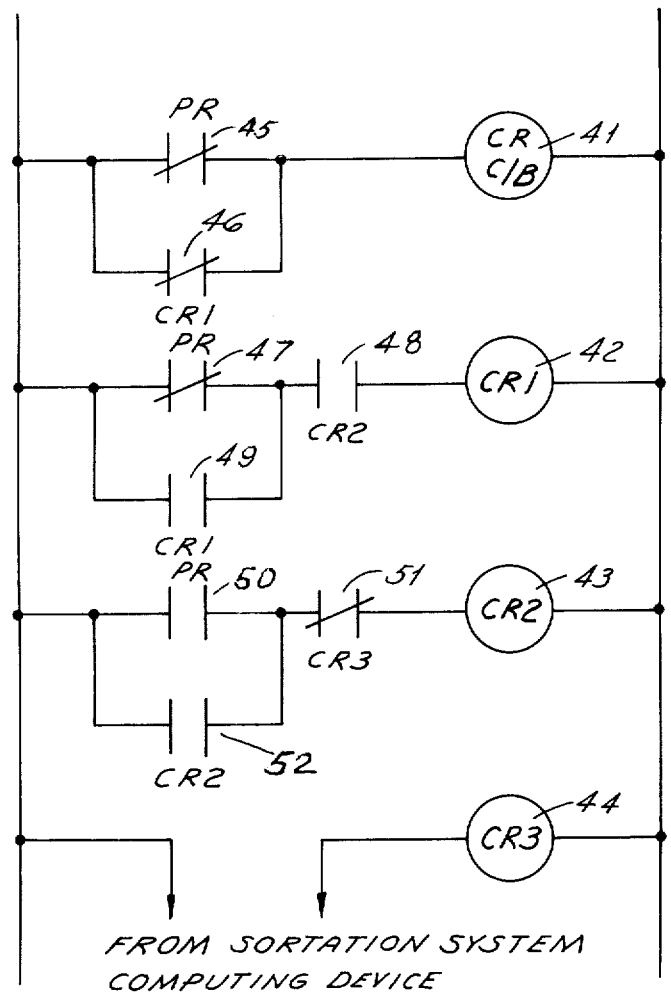

SORTING SYSTEM

This invention relates to sorting systems.

BACKGROUND OF THE INVENTION

In sorting of articles for delivery to predetermined locations, it has been heretofore suggested to encode the memory of sortation systems to deliver the articles as required.

However, it is desirable to maximize the flow rate and sorting rate by minimizing the spacing between successive articles even though the articles vary in length.

Other prior control devices have no means for measuring the length of objects while controlling the object spacing in a manner to permit maximum flow and sort rate. They consumed extra but unnecessary distance to measure object length, thus forcing inefficient flow rates. They have not controlled release of succeeding articles on the basis of measured length of the articles.

Accordingly an object of this invention is to perform these measurements and control functions to achieve maximum system efficiency by finding the center or other position of objects such as boxes, mail sacks, luggage, cartons, and other goods conveyed on sorting systems, and controlling the rate at which they are inducted or entered onto the conveyor device.

A further object of the invention is to provide a method and apparatus for delivering articles to predetermined locations at a rate which is determined by the velocity of the conveyor, the length of time that a diverter interferes with the free flow of objects, the effective length of the diverters, the length of the objects, and the spacing between them.

Previous devices also prevented the entry of address information until the goods passed a point where their length was measured by means of a photosensing device. This delay inhibited the rate of flow of goods. A further object of this invention is to provide greater flexibility for entry of address information into the sort system control device by a design which does not inhibit the rate of flow but provides a sufficient span of time which will permit entry of the address information prior to passage at the measuring position, without loss of control.

Another object of the invention is to provide a means of ignoring false indication of goods which may occur when the sensing device is interrupted by irregular outlines, reflective surfaces, and appendages to the object, such as tags and handles.

Other prior systems use techniques which prevent the control device from remembering information if the conveyor stops, and which depend upon a time period measurement increment fixed by a predetermined constant, such as a 60-cycle AC line frequency. Accordingly a further object is to provide a means of measurement and control for conveyor motion at different velocities, and if the conveyor momentarily stops forward motion by using a timing pulse which is derived from the conveyor moving surface, regardless of the velocity, and which device is designed to retain memory of received information if the conveyor stops and to hold it until the system resumes operation.

Other prior devices depend upon the entry of address information by human operators, and therefore are inhibited by the alertness and desire of the operator. Another object of the invention is to provide a means for both manual and automatic entry of address information into the control device which uses induction of material onto a sortation conveyor by computed object spacing without inhibition by entry of address information; and which also permits automatic address reading while maintaining maximum flow of goods.

SUMMARY OF THE INVENTION

In accordance with the invention, means are provided for maximizing flow rate and sorting rate by minimizing the spacing between articles of varying length. Such means measures the length of the articles and controls their movement into the sortation system so as to minimize spacing between the articles. The system permits maximizing the rate of sortation while taking into account conveyor speed, length of time for diverting to zones, length of the articles and spacing between them. In addition, the system is arranged to prevent false signals due to tags and the like.

DESCRIPTION OF THE DRAWINGS

FIG. 1 is a diagrammatic perspective view of an apparatus embodying the invention.

FIG. 1A is a fragmentary perspective view of a modified form of apparatus.

FIG. 2 is a block diagram of a portion of the system.

FIG. 3 is a schematic diagram of the computing device.

FIG. 4 is a control circuit of a part of the system.

DESCRIPTION

Referring to FIG. 1, the system embodying the invention comprises a pacing conveyor or induction device 16, herein shown as an endless belt conveyor, which carries articles past a first photoelectric sensor 11 and a reflector 12, which deenergize the drive of conveyor 16. When energized, as presently advised, conveyor 16 delivers an object to a conveyor 10 which moves the object past a second sensor 13 and reflector 14 to one of a plurality of diverters 15.

An object 0 comes into the system on the escapement device 16. When the object 0 reaches the photoelectric sensor 11 and a photoreflector 12, it is stopped by activating a braking device, upon interruption of the light beam from photosensor 11. The object is then held at this point until an activating pulse is received from the controller C. Upon reception of the activating pulse, the braking mechanism is released and the object is transferred onto the sortation conveyor 10. As the object passes another photoelectric sensor 13 and photoreflector 14, a signal is sent to the controller C which shows the presence of the object. The controller counts the length of passage by sensing pulses from a memory synchronization unit (clock generating device) 17 attached to the drive mechanism of the sortation conveyor, or attached to the conveying surface.

The memory synchronization unit 17 produces pulses at a rate directly proportional to conveyor surface motion. In this manner the controller C determines the exact position of the object relative to the induction release point at the first photosensor 11 and also relative to the position of diverters 15, downstream from the object.

Controller C accomplishes two purposes with this information. First, it provides a timing pulse to the tracking memory in the controller which locates the center of the objects relative to the downstream diverters. In this manner they can be pushed off of the sortation conveyor accurately at their addressed destination.

Second, the computing device sends a pulse back to the induction release mechanism which releases the next object waiting at the photosensor 11. The time of this pulse is related to the size of the previous object in such a manner that the following object can be released at the first available opportunity without interference in the action of the downstream diverters. In this manner the controller C achieves maximum utilization of the space on the sortation conveyor, and hence maximum flow rate.

DESCRIPTION OF CONTROLLER

FIG. 2 attached is a block diagram of the major functions of the controller. A keyboard 18 is used by an operator to enter address codes into the controller. Alternately, the codes may be entered by an automatic code reader 19 which scans labels attached to the objects on the sortation conveyor (FIG. 1A). The codes are registered temporarily in the address code storage 20. As the object passes the photosensor 13 mounted on the sortation conveyor, a signal to the computing device gates the clock pulses from the memory synchronization unit 17. The computing device 21 then computes the length of the object and produces a timing pulse which releases the next object in line by a gate release signal. The computing device 21 also produces a timing pulse which strobes an address code transfer storage register 22. This timing pulse can be programmed to occur at any point in the motion of the object past the photosensor 13. It may be used on the leading edge of the object, on the trailing edge, at any point between, or after the object has left the photosensor but before the next object arrives. In the system illustrated in this disclosure, the computing device is programmed to provide this code transfer pulse or strobe a short distance after the leading edge of the object in order to detect appendages such as tags, and handles or irregular shapes which may give a false indication of the length of the object.

The computing device also produces a timing pulse which notifies the recirculation (tracking) memory 23 that an object is in transfer, and the center position of that object on the sortation conveyor. This timing pulse transfers the address codes into the recirculation (tracking) memory at the same time that it transfers the location information into the memory. After entry of information into the memory, another timing pulse goes back from the memory to the computing device 21 to indicate that the information has been accepted by the memory and that it is ready for additional information. The memory then counts the distance to the diverter for that particular address code, and sends out a timing pulse which is used to activate the diverter output 24 at that location along the sortation conveyor.

Description of Computing Device

The computing device shown in FIG. 3 comprises a group of electronic circuits capable of recognizing the presence of an object passing the photosensor 13 counting the interval of the passage based on distance as measured by the memory synchronization unit 17 attached to the moving belt surface and producing an output timed to coincide with the center of the object passing an arbitrary but predetermined location along the sortation conveyor. The device also transfers address code into the storage register, notifies the tracking memory that passage of an object on the moving surface has begun from the arbitrary reference point, and notifies the induction gate release device that another object may be entered onto the conveyor.

Acceptance of information by the tracking memory is then relayed back to the computing device to reset the device for a new measurement period.

In the application illustrated in this disclosure the circuit was realized by the use of integrated circuits, type TTL (transistor-transistor logic), but other devices could be employed, including relays, vacuum tubes, transistors, MOS (metal-oxide semiconductor), charge-coupled devices, ferro-magnetic devices, magnetic bubble devices, and so on. Any device can be employed that is capable of controlled change in binary state, and temporarily retains its condition in the energized state.

The photosensor 13 input is logic low (0) without an object passing in front of it. Under this condition the inverter, such as SN7404, 26, has a logic high (1) output. The half-rate counter, SN74107, 29, is held with a logic high on the Q output. The timing clock input from the memory synchronization unit produces no action from the half-rate counter, 29, but causes the gate, SN7400, 27, to produce an output directly inverse to the input of the gate; logic high for logic low input from the timing clock, logic low for a logic high input from the timing clock. Since the gate, SN7400, 28, is held high by the output Q from the half-rate counter, 29, the timing clock signal passes through to the input of the first stage of the distance counter, SN74177, 31. The counter counts to full count, with outputs sensed by the gates SN7420, 34 and 36. These gates are activated by input signals which have been wired according to desired counts from the counter. The address strobe gate SN7420, 34, may be wired to sense the count corresponding to 12 inches of object travel, or any other desired distance to provide a window and thereby prevent false signals due to irregular outlines, reflective surfaces and appendages such as tags or handles. The gate, SN7420, 36 may be wired for any object length desired, merely by removing or adding other stages of count. In this particular example, the counter SN741777, 31, 32, and 33, is wired for 48 inches of object length.

Upon reaching the address strobe count, the flip-flop, SN7474, 35, changes state to produce a logic high output at Q, and a logic low at $\overline{Q}$. This low output inhibits the action of the counter clear circuit, SN74121, 30, until reset by the data accept signal from the tracking memory. Upon reaching the object length count at the output of the gate SN7420, 36, the flip-flop, SN74107, 37, changes state, with a logic high data ready signal to tracking memory from Q output, and a logic low signal from $\overline{Q}$ output to the induction gate control circuit. At the same time, a logic low signal is fed back to the control input on the counter circuit, SN74177, 31, which inhibits further count until a counter clear signal is received from the single-shot, SN74121, 30.

If for any reason it is decided to space the objects a distance greater than the minimum, a manually operated time delay 39 can be provided in the induction gate release signal circuit to add a predetermined time interval before the next object is released.

When the tracking memory has accepted the signal from the flip-flop, SN74107, 37, it sends back a logic low data accepted signal which clears the flip-flop SN7474, 35, and the flip-flop SN74107, 37 returning both to logic low outputs on the Q side and logic high outputs on the $\overline{Q}$ side. The clear inhibit signal from 35 goes to logic high, and the counter clear single-shot, SN74121, 30, is made active for the passage of another object.

When the next object blocks the photosensor 13, the photosensor input goes to logic high. The output of the inverter 26 goes to logic low and blocks the passage of timing clock signal through the gate 27. The half-rate counter 29 now is clear to accept signals from the timing clock input. It toggles at half of the clock rate, and thus divides by two. The output of the gate 27 is held high, and the half-rate clock passes through the gate 28. The counter 31, 32, 33 then counts at half-rate until the photosensor input again goes to logic low with the passage of the object.

The breaking of the photosensor path by the leading edge of the object caused the logic high signal from the photosensor to be inverted by the inverter circuit, SN7404, 38, to cause the single-shot 30 to produce an output which clears the counter for the new cycle.

The clear single-shot 30 can be reset until such time that the clear inhibit signal prevents reset. Thus, if the address strobe signal is, for example, wired to produce an output for 12 inches of object travel, the counter can be reset for any interruption of the photosensor 13 prior to that point. Thus, false interruption of the photosensor 13 due to tags, handles, irregular shapes and so on, will not produce a count. If the photosensor is interrupted by a handle, the counter will start count. But the photosensor output goes to logic low with the beam re-established, and then goes back to logic high when the real outline of the object again breaks the photosensor beam. This produces a low logic signal on the input to the clear single-shot 30 which in turn produces an output and clears the counter. In this manner the counter begins another new count on the real leading edge of the object. The memory then tracks the object on this real photosensor interrupt, not the false interrupt of handles, tags, and so on.

The counter then continues to count to maximum value and the completion of the cycle.

The output of the counter circuit from the flip-flop 37 always occurs at some predetermined distance in front of the photosensor. In this example the distance is two feet. The time of the output corresponds with the center of the object passing that predetermined point. This is the reference point on the conveyor which determines the input to the tracking memory, and the release of another object onto the conveyor.

Description of the Induction Gate Control Circuit

FIG. 4 is a typical circuit for control of the induction gate release device. In this example it is assumed to be a clutch/brake mechanism controlling the forward motion of the pacing or escapement conveyor 16. However, it may be any suitable release mechanism.

The escapement conveyor is assumed to have forward motion at the same velocity as the sortation conveyor. It runs freely until an object hits the photosensor 11. The control circuit is designed such that the first object to block the path of the photosensor 11 will not activate the clutch/brake control, but will pass through directly onto the sortation conveyor.

Upon first blockage of the photosensor 11, PR contact 50 closes and activates the control relay CR2, 43, through CR3 contact 51. Meanwhile the PR contacts 45 and 47 have opened. The clutch/brake control CR C/B, 41, remains activated through the closed contact of CR1, 46. When the control relay CR2, 43 activates, contact CR2, 52, closes and seals the circuit to keep CR2, 43 active regardless of the state of the PR contact 50. At the same time CR2 contact, 48, closes. When the object is past the photosensor 11, PR contact 47 closes activating the control relay CR1, 42. This closes CR1 contact 49, and seals the circuit to maintain CR1 active.

Meanwhile, PR contact 45 has closed with the passage of the object and the clutch/brake control continues to remain active. CR1 contact 46 has opened in preparation for the next object. When it reaches the photosensor 11, PR contact 45 opens, and the clutch/brake relay CR C/B 41, deactivates to stop the escapement conveyor. The object is held at this point until a pulse comes back from the controller to activate control relay CR3, 44. This breaks the contact CR3 51 to deactivate control relay CR2 43. This, in turn, deactivates CR2 contact 48 to deactivate control relay CR1, 42. Contact CR1 closes 46, and the clutch/brake relay 41, again becomes active to permit the escapement device to run and induct the object onto the sortation conveyor.

If a pulse comes back from the controller prior to the interruption of the photosensor beam by the following object, the circuit is also reset, and will permit the escapement conveyor to deliver the object onto the sortation conveyor without interruption of forward motion. In this manner the system will continue to receive objects for sortation regardless of their relative position, and to deliver them to the sortation system at maximum efficiency, if they are available at the induction point.

The control process assumes that there is sufficient separation between objects for the photosensor 11 to detect their presence.

Theory of Operation

The rate at which objects may move along a sortation conveyor without interference in operation of the sortation is determined by the velocity of the conveyor, the length of time that a diverter interferes with the free flow of objects, the effective length of the diverters, the length of the objects, and the spacing between them. It can be shown from elementary considerations that the theoretical minimum distance between objects is expressed mathematically by the following equation:

$$L_o = VC + \tfrac{1}{2}(d+L)$$

$L_o$ is the distance between the center of two consecutive objects, $V$ is the velocity of the sortation conveyor, $C$ is the cycle time of the diverter, or the time that it is in actual interference with the flow of goods, $d$ is the effective length of the diverter along the path of flow, and $L$ is the length of the object next in line.

The objective of the controller is to maintain this minimum theoretical distance, within the confines of a practical system. Previous control devices depended upon a fixed length between objects, at least as great as the maximum object length. This restriction prevented the systems from working at maximum efficiency. For example, if the maximum object length were five feet, then for extended periods of operations with objects approximately two feet long, the conveyor could not sort faster than with five-foot objects. This difference could seriously impede the sort rate for smaller objects. However, the above equation shows the objects of theoretical zero length still have a maximum flow rate of some finite value. If $L$ in the above equation is zero, or some small value, the minimum distance between objects is $L_p = VC + \frac{1}{2} d$. The sortation system cannot be worked at a rate faster than determined by this minimum distance. In this equation it is assumed that all objects are pushed from the conveyor by the impact upon the object center from the center of the diverter blade device. This assumption and principle of operation are necessary if the objects are not to be removed in awkward or dangerous positions which would impede operation of the system.

The minimum distance expressed by the equation determines the distance along the conveyor at which the tracking signal is transferred to the tracking memory and also the induction gate release point. Since both the tracking signal to memory and the gate release signal occur at the same time, the leading edge of the next object starts onto the sortation conveyor at this time. Then the factor of $\frac{1}{2}L$ in the above equation (the distance from leading edge to center of object), is added to the distance from the center of the preceding object, thus maintaining the correct minimum distance between the center of both objects for maximum flow rate. If the computing device has an output which occurs two feet in front of the photosensor 13 for the center of the first object, then the photosensor must be placed in front of the induction gate at a distance corresponding to the minimum distance, $VC + \frac{1}{2} d$, minus the computing output distance, in this illustration, two feet.

I claim:

1. In a conveyor sorting system, the combination comprising
    a conveyor for moving objects along a predetermined path,
    a plurality of means for diverting objects at longitudinally spaced points along the conveyor,
    induction means for introducing objects to one portion of the conveyor for movement by the conveyor to said diverter means,
    means for sensing objects moving along said conveyor,
    synchronizing means producing clocked pulses at a rate corresponding to the surface displacement of the conveyor,
    and control means responsive to said sensor means and said synchronizing means for producing a timing pulse thereby indicating the location of said object relative to said induction means and said diverter means, and for producing a signal for activating said induction means to introduce another object to the conveyor,
    said control means producing said signal for activating said induction means at a time corresponding to the trailing edge of the longest object being sorted.

2. In a conveyor sorting system, the combination comprising
    a conveyor for moving objects along a predetermined path,
    a plurality of means for diverting objects at longitudinally spaced points along the conveyor,
    induction means for introducing objects to one portion of the conveyor for movement by the conveyor to said diverter means,
    means for sensing objects moving along said conveyor,
    synchronizing means producing clocked pulses at a rate corresponding to the surface displacement of the conveyor,
    and control means for receiving a code and a plurality of pulses from said synchronizing means and actuated by said sensor means to provide signals for energizing the appropriate diverter means and the induction means at a rate such that a minimum distance is maintained between successive objects,
    said control means including an address code storage means for receiving a code,
    address code transfer means associated with said address code storage means,
    a recirculating memory means associated with said address code transfer means,
    and a computing device associated with said address code transfer means and said recirculating memory,
    said recirculating memory producing said signal for said diverter means,
    and said computing device producing said signal for said induction means.

3. The combination set forth in claim 2 wherein said computer device comprises binary means for receiving a signal from said sensor means and said synchronizing means,
    a first gate for receiving a signal from said sensor means and said synchronizing means,
    a second gate for receiving a signal from said first gate and said binary means,
    and a clock circuit connected to the output of said second gate.

4. The combination set forth in claim 3 including second binary means for receiving the output of said clock circuit.

5. In the method of sorting of objects wherein objects are introduced onto a conveyor and then diverted at predetermined points along the conveyor, the steps comprising
    sensing the movement of an object past a fixed point on the conveyor,
    producing a plurality of pulses proportional to the surface displacement of the conveyor,
    initiating a count of said pulses as the article moves past the fixed point,
    initiating a second count of said pulses simultaneously with the termination of said first count at a second rate,
    terminating said counts at a time corresponding to the movement of an object of the maximum length being sorted past a predetermined point.

6. In the method of sorting articles, the steps comprising
    positioning a sensor at a point along a conveyor spaced from the point of induction of articles to the conveyor in accordance with the formula $vc + \frac{1}{2} d$ wherein $v$ is the velocity of the conveyor, $c$ is the cycle time of the diverter, or the time that it is in actual interference with the flow of goods, and $d$ is the effective length of the diverter along the path of flow.

7. In a conveyor sorting system, the combination comprising
    a conveyor for moving objects along a predetermined path,
    a plurality of means for diverting objects at longitudinally spaced points along the conveyor, induction means for introducing objects to one portion of the conveyor for movement by the conveyor to said diverter means, means for sensing objects moving along said conveyor, synchronizing means producing clocked pulses at a rate corresponding to the surface displacement of the conveyor, and control means for receiving a code and a plurality of pulses from said synchronizing means and actuated by said sensor means for energizing the appropriate diverter means and the induction means at a rate such that a minimum distance is maintained between successive objects, said control means functioning to activate the induction means such that the distance between the center of two consecutive objects placed on the conveyor is defined by $L_e = VC + \frac{1}{2}(d + L)$ wherein V is the velocity of the conveyor, C is the cycle time of the diverter, or the time that it is in actual interference with the flow of goods, $d$ is the effective length of the diverter along the path of flow, and L is the length of the object next in line.

8. In a conveyor sorting system, the combination comprising a conveyor for moving objects along a predetermined path, a plurality of means for diverting objects at longitudinally spaced points along the conveyor, induction means for introducing objects to one portion of the conveyor for movement by the conveyor to said diverter means, means for sensing objects moving along said conveyor, synchronizing means producing clocked pulses at a rate corresponding to the surface displacement of the conveyor, and control means for receiving a code and a plurality of pulses from said synchronizing means and actuated by said sensor means for energizing the appropriate diverter means and the induction means at a rate such that a minimum distance is maintained between successive objects, said sensor means being positioned adjacent said induction means and at a distance therefrom corresponding to $L_{min} = VC + \frac{1}{2}(d - L_{max})$ wherein $V$ is the velocity of the conveyor, C is the cycle time of the diverter, or the time that it is in actual interference with the flow of goods, $d$ is the effective length of the diverter along the path of flow, and $L_{max}$ is the maximum length of the object next in line.

* * * * *